United States Patent [19]

Underwood

[11] 3,949,894
[45] Apr. 13, 1976

[54] LAMINATED CONTAINER
[75] Inventor: Theodore A. Underwood, Cuyahoga Falls, Ohio
[73] Assignee: Goodyear Aerospace Corporation, Akron, Ohio
[22] Filed: Jan. 2, 1975
[21] Appl. No.: 538,045

[52] U.S. Cl. ................ 220/63 A; 428/35; 428/215; 428/267; 428/273; 428/340; 428/421; 428/417; 428/912
[51] Int. Cl.² ............................................ B23K 1/16
[58] Field of Search .......... 220/63 A; 428/215, 219, 428/265, 267, 273, 285, 286, 287, 340, 421, 415, 417, 911, 912, 35

[56] References Cited
UNITED STATES PATENTS

| | | | |
|---|---|---|---|
| 3,444,033 | 5/1969 | King | 428/911 |
| 3,486,966 | 12/1969 | Allen et al. | 428/911 |
| 3,529,995 | 9/1970 | Smith et al. | 428/467 |
| 3,556,922 | 1/1971 | Green et al. | 428/417 |
| 3,577,306 | 5/1971 | Baker et al. | 428/911 |
| 3,770,493 | 11/1973 | Gilbert | 428/421 |
| 3,850,674 | 11/1974 | Clarke, Jr. et al. | 428/421 |

*Primary Examiner*—Marion E. McCamish
*Assistant Examiner*—William R. Dixon, Jr.
*Attorney, Agent, or Firm*—F. W. Brunner; H. C. Young

[57] ABSTRACT

Laminated container suitable for containing high-temperature lubricating oil which comprises a rigid container having adhered to its outer surface a laminate of outwardly successive adherent laminae comprising a first lamina of rubbery polyfluorohydrocarbon, second lamina of flexible multiple layers of coated textile fabric and, if desired, a third outer rigid lamina of multiple layers of polymer-encapsulated glass fibers.

5 Claims, 6 Drawing Figures

U.S. Patent   April 13, 1976   3,949,894
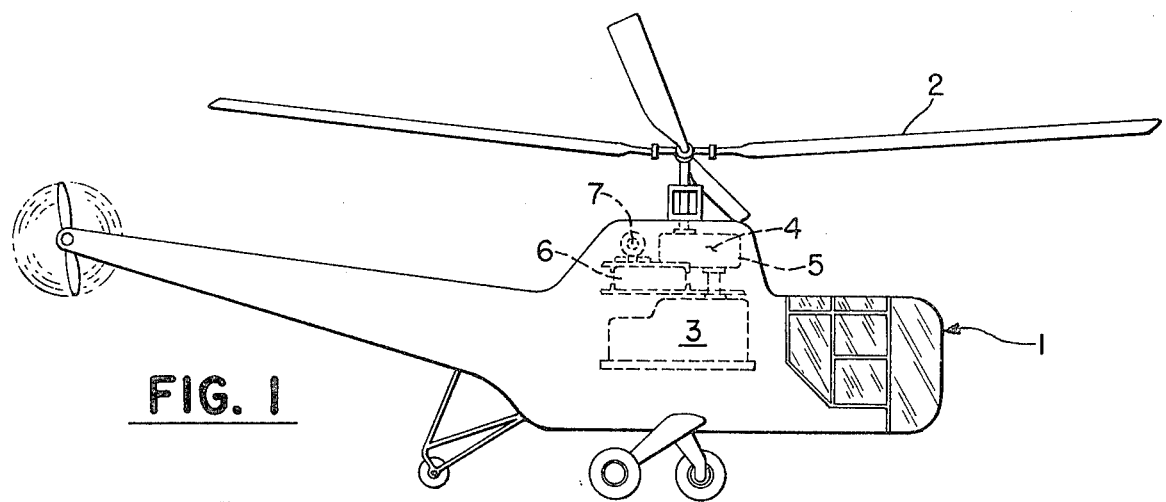
FIG. 1
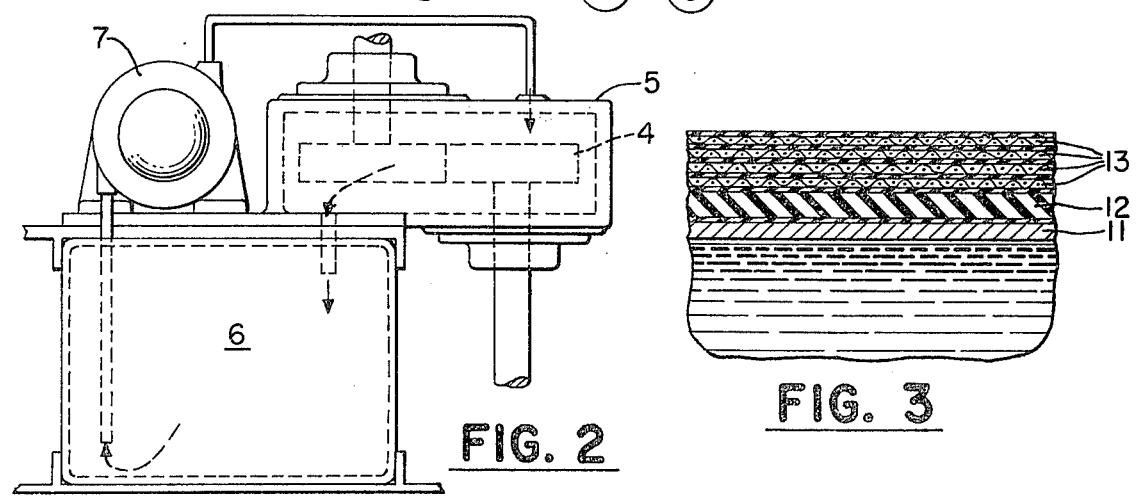
FIG. 2
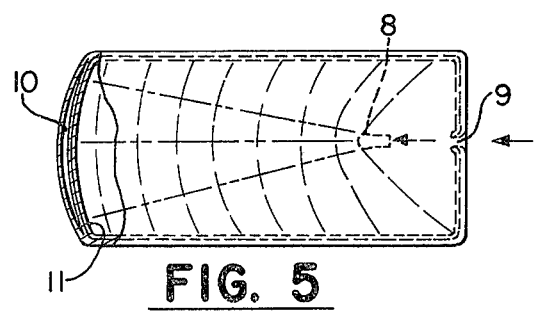
FIG. 3
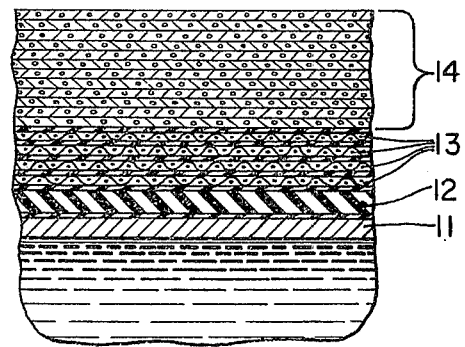
FIG. 4
FIG. 5
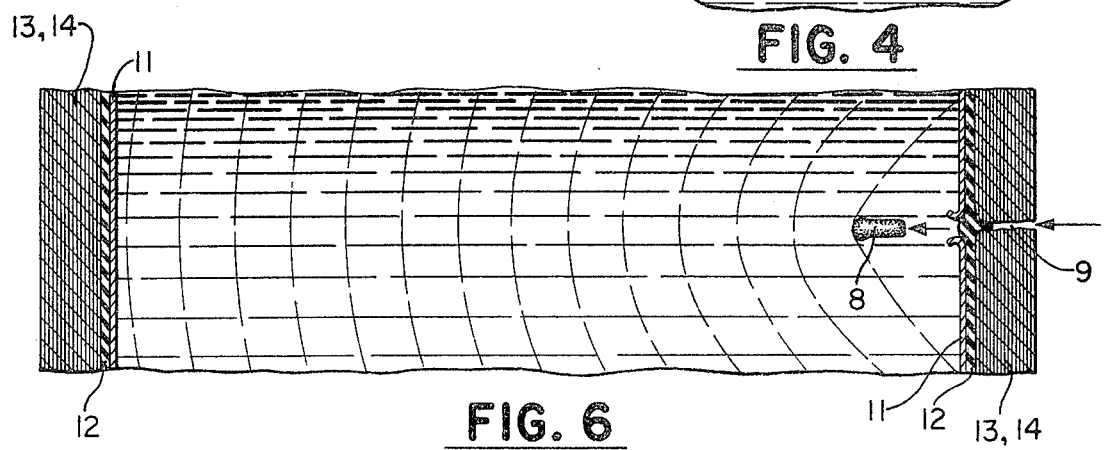
FIG. 6

LAMINATED CONTAINER

This invention relates to a container laminate suitable for protectively containing hot lubricating oil. This invention particularly relates to an adherent protective laminate over a rigid container for containing high temperature lubricating systems which is particularly protective against puncture and delamination upon projectile impact.

Often times a close meshing multiple gear assembly is required to operate at a high rate of speed and at a high temperature. Where such assemblies have very close tolerances their individual gear meshing surfaces must be adequately lubricated in order to both reduce metal-to-metal friction and to rapidly carry away generated heat. Such lubrication problems can be found, for example, in various transmission assemblies for rotary and fixed wing aircraft. If a lubricating oil system operationally providing lubrication for such gear assemblies should become punctured with an impacting projectile causing immediate loss of oil, the gear mechanism can typically lock up in a few seconds due to lack of lubrication and due to a resultant rapid heat build-up.

Therefore, it is an object of this invention to provide a protective container laminate for a lubricating system which is required to operate at high temperatures and which can withstand the puncture of an impacting projectile and its accompanying hydraulic ram effect.

In accordance with this invention, a laminated container suitable for containing lubricating oil at a temperature in the range of about 150° to about 230°C comprises an oil-impervious rigid container having adhered to its outer surface a laminate of outwardly successive adherent laminae comprising a first rubbery polyfluorohydrocarbon composition lamina adhered to said rigid container with a polyfluorohydrocarbon cement and a second lamina of flexible, substantially nonextensible multiple layers of an aromatic polyamide textile fabric coated with a flexible polyfluorocarbon composition, said second lamina adhered to said first lamina with a polyfluorohydrocarbon cement.

It is further preferred that said laminated container have adhered thereto a third outer rigid lamina of multiple layers of substantially polymer-encapsulated glass fibers, particularly layers of polyester or thermoset epoxy encapsulated woven glass fiber mat.

The objects and advantages of this invention can be more readily understood by reference to the accompanying drawing. In the drawing, FIG. 1 depicts a helicopter having a gear box or transmission connected between the motor and the propeller blades.

FIG. 2 is a cross-sectional view of the gear box with its sump for containing oil.

FIG. 3 is an enlarged cross-sectional view of a wall portion of the container.

FIG. 4 is also an enlarged cross-sectional view of a wall portion of the container showing an outer fiberglas adherent lamina.

FIG. 5 is a cross sectional view of an oil container depicting the effect of an impacting projectile and its resulting hydraulic ram effect on the opposite wall, causing delamination.

FIG. 6 is an enlarged cross-sectional view of a portion of the container for lubricating oils depicting the sealing effect of the inner flexible layer and the stabilizing effect of the outer rigid layer upon the puncturing of the container by a projectile and upon the impacting of the opposite wall with its resultant hydraulic ram.

Reference to the drawings shows a helicopter having overhead rotary propeller blades 2 and having a motor 3 positioned amidships with a transmission 4 contained within a gear box 5 connecting the motor 3 and the propeller blades 2. The transmission 4 is used to vary the ratio of motor speed to propeller axle speed as well as to control the actual pitch of the propeller blades themselves as they rotate. The complex gear mechanism of the transmission 4 within the gear box 5 is required to have close tolerances even at high speeds. Therefore, adequate lubrication is required both to lubricate the gear system itself and to carry away heat build-up. This is accomplished by continually pumping lubricating oil from an oil sump 6 by a recirculating pump 7 to the gear mechanism. Generally, the lubricating oil is splashed over the gear system and then allowed to drain back into the oil sump 6 from which it is then recirculated back to the transmission. Thus, the oil sump 6 itself acts as a reservoir and also as a heat exchanger.

If the gear box or the oil sump should become punctured by an impacting projectile 8, then the oil would be released from the system and the gears would quickly freeze or lock up, typically within a few seconds, due to lack of lubrication and, even more important, a very substantial and rapid heat build-up.

Surely, an obvious solution to this problem would simply be to apply a layer of soft rubbery material around the gear box or around the oil sump to close the hole in the container caused by the puncture 9 of an impacting projectile 8. In practice, however, it has been found that the relatively severe requirements of protection of the oil system exceed the capabilities of any ordinary sealing materials or layer composite. Two immediate problems occur which must be solved. First, the container must be quickly sealed against oil loss upon being punctured by the projectile. Because of the relatively high temperature of the container and because of the lubricity of the lubricating oil, an ordinary layer of sealing material is generally unsatisfactory.

In accordance with this invention, it has been found that a lay-up of a rubbery polyfluorohydrocarbon material backed with multiple layers of a flexible, substantially non-extensible, textile fabric impregnated with a polyfluorohydrocarbon can effect such a seal at the high temperatures.

However, a very important second problem also occurs. The second problem involves an immediate hydraulic ram effect caused by the high momentum of an impacting projectile. This effect is concentrated on the opposite wall of the container as more clearly shown in FIG. 5. Indeed, it is not uncommon for a typical coating or laminate composite covering the opposite outer portion of the container to delaminate 10 and thus substantially weaken the structure. In the practice of this invention, it has been found that an outer rigid composite build-up adhered over the initial laminate of multiple layers of rigid polymer-encapsulated glass fiber composite is necessary to absorb the shock of the hydraulic ram effect and prevent appreciable delamination of the opposite side of the container.

In the practice of this invention, the oil-impervious rigid container 11 can be of any of various materials which are known to be essentially oil impervious. Representative of such various rigid materials are metals, such as steel and steel alloys, and rigid polymer, particularly thermoset polymer, encapsulated glass fibers. The actual selection of such materials for the rigid container is not considered to be a critical aspect of this invention, since the major technical advance is involved with the outer adherent laminate covering such a container. Generally, the first lamina 12 of flexible polyfluorohydrocarbon composition has a thickness in the range of about 0.3 to about 0.6, preferably about 0.35 to about 0.45, inches, the second lamina 13 preferably has a thickness in the range of about 0.03 to about 0.12, preferably about 0.04 to about 0.1, inches and is of about four to about eight multiple layers of said coated textile fabric, and the third outer rigid lamina 14 preferably has a thickness of about 0.04 to about 0.2, preferably about 0.1 to about 0.13 inch and is comprised of about four to about 14 layers of said encapsulated woven glass fibers.

The polyfluorocarbons useful in this invention for both the initial protective layer and for the preparation of the adhesive are the highly halogenated chain polymers whose structure is composed substantially exclusively of carbon, hydrogen and halogen atoms, particularly chlorine and fluorine, and are reacted at elevated temperatures with an organic peroxy compound which is stable against decomposition below about 50°C and with a basic metal compound, to produce a cross-linked polymer. It is preferred that the chain polymers be at least half fluorinated and that —$CH_2$— groups be present. In other words, at least some of the carbon atoms on the chain should be bonded only to hydrogen atoms and other carbon atoms.

Chain polymers with a minor degree of disorder in their molecules are generally more thermoplastic in nature than those without such disorder. Elasticity requires a greater degree of disorder. In order to obtain an elastomeric product, at least 10 percent of the carbon atoms in the structure must be of the type which are bonded only to hydrogen atoms and other carbon atoms. Ordinarily, a mono-olefinic compound containing a $CH_2$= group is used to provide these carbon atoms, and this results in chains containing —$CH_2$— groups. Ordinarily, such a mono-olefinic compound is copolymerized with another highly fluorinated mono-olefin to help give the polymer molecule its highly fluorinated nature.

Among the highly fluorinated mono-olefins which may be used as comonomers are: $CF_2=CFCl$, $CF_2=CCl_2$, $CF_3—CF=CF_2$, $CF_2=CHCl$, $CF_3—CCl=CCl—CF_3$, $CF_3=CHF$, $CF_3—CH=CH—CF_3$ (cis or trans), $CF_2=CF_2$,

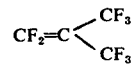

$CF_2=CFBr$, $CF_2=CCl—CF_3$, $CF_3—CH=CH_2$ and $CF_3—CCl=CCl_2$.

Among the hydrogen containing mono-olefins which may be used as comonomers with the above highly fluorinated mono-olefins are: $CF_2=CH_2$, $CFH=CH_2$, $CH_2=CH_2$, $CH_2=CH_2$, $CFCl=CH_2$, $CClH=CH_2$, $CHBr=CH_2$ and

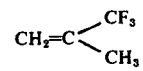

Of these, the most advantageous combinations are: $CF_2=CFCl/CF_2=CF_2/CF_2=CH_2$, $CF_2=CF_2/CH_2=CFCl$, and $CF_2=CFBr/CF_2=CH_2$.

The aforementioned mono-olefins may be copolymerized in any proportions, depending on the characteristics desired. Good chemical stability requires fluorine substitutions at at least one-half of the possible positions for such substitution in the polymer chain.

It is to be noted that all of the monomers enumerated above contain only carbon, hydrogen and halogen atoms and, therefore, produce copolymers substantially without markedly reactive functional groups. This, of course, does not preclude the presence of other atoms in end groups which might be formed by chain stoppers in the polymerization zone, present by design or by accident. Such end groups are relatively few in number and are difficult to detect. They do not generally affect the characteristics of the polymer to any noticeable degree.

The textile fabric used in the preparation of the second lamina for this invention are made from polymers selected from aromatic polyamides, or nylon, and from polyaramides, a type of nylon, such as the polyaramide available under the trade name Kevlar from The E. I. du Pont de Nemours & Company. For example, such a polyaramide may have the following structure:

(A)

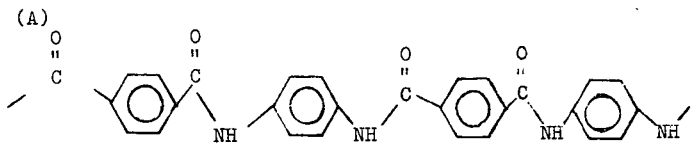

or (B)

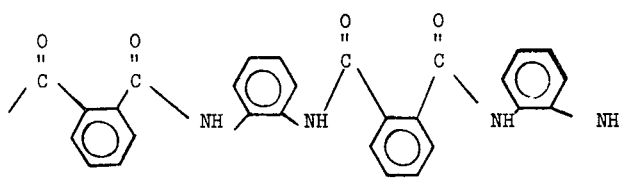

Suitable aromatic polyamides, of the well known nylon type are also described in Modern Plastics Encyclopedia (1968–9) and generally are of units generally indicated by the formula:

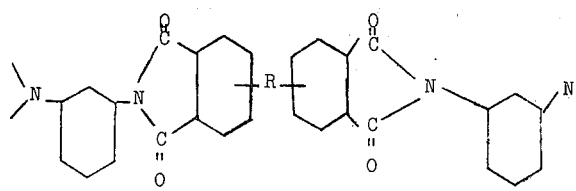

where R is alkylene, arylene or substituted arylene, preferably of 2 to 10 carbon atoms and usually of about 50,000 molecular weight, though those of 100,000 and higher can also be used.

These polyimides are sometimes considered to be a reaction product of an aromatic tetracarboxylic acid anhydride and an aromatic diamine. The specific polyimide representative of the class is one prepared by reaction of benzophenone tetracarboxylic acid dianhydride and metaphenylene diamine. This reaction product is essentially high molecular weight linear polymers with a limited degree of crosslinking and a high glass transition temperature (Tg).

The textile fabric used for the second lamina of this invention is preferably a woven fabric having a weight of about 10 to about 15, preferably about 11 to about 13, ounces per square yard and having a thickness in the range of about 0.008 to about 0.016, preferably about 0.01 to about 0.012 inch. In the practice of this invention, the textile woven fabric preferably has a coating of said polyfluorohydrocarbon composition on its fibers of a thickness in the range of about 0.001 to about 0.005, preferably about 0.002 to about 0.003 inch. Generally, such polyfluorocarbon composition is simply applied to the fabric by solvent dipping or brushing followed by removing the solvent by evaporation, although it may be applied by calendering.

In the practice of this invention, the rigid polymer-encapsulated glass fiber composite to be adhered over the initial laminate can be prepared of various materials. The glass fiber itself can be of non-woven, mixed strands, or of a textile weave. Roving, or non-woven strands, can be used where it is necessary to shape or fit the composite around and into intricate contours. The glass fibers can be encapsulated by various rigid plastics such as well known thermoset polyesters and epoxy resins. The epoxy resins are generally preferred for the high temperature exposure. Generally such fibers are encapsulated to an extent that the encapsulating polymer forms a layer over the glass fibers having a thickness in the range of about 1 to about 10, preferably 2 to about 5, mils. In the further practice of this invention, it is preferred that multiple layers of the glass fiber composite are used, such as about four to about 14 layers adhered to each other and to the first laminate, each individual layer having a thickness in the range of about 10 to about 20, preferably about 12 to about 15, mils. Generally, the glass fiber composite layers can be easily adhered to each other and to the initial laminate by simply building up the layers while the encapsulating, thermoset polymer is only partially cured, following which during the curing step, the adherance of the composite layers is enhanced.

Although epoxy resin is generally preferred, a rigid polyester-type encapsulated glass fiber composite can be prepared by first mixing glass roving, or non-woven, fiber strands, with a composite prepared from a polyester, styrene/monomer, thickening agent and peroxide curative. The mixture is conveniently cast into a sheet, allowed to thicken, or loosely polymerize, and stored as a tack-free, or practically tack-free composite. When it is to be used, the substantially thermoplastic composite is simply placed in or fitted around a mold and shaped to a desirable contour. With the application of heat, and pressure if desired to assist the shaping operation, the composite cures to a thermoset polyester-encapsulated glass roving. Representative of polyesters for this purpose are those of the type prepared by the reaction of adipic or fumaric acid with hydrocarbon diols such as ethylene glycol and 1,4-butane diol. A suitable thickening agent can be magnesium oxide. A suitable curvative can be dicumyl peroxide.

The practice of this invention is further illustrated by reference to the following examples which are intended to be representative rather than restrictive of the scope of the invention. Unless otherwise indicated, all parts and percentages are by weight.

EXAMPLE I

Protective containers, suitable for use as a transmission sump for a gear mechanism of a helicopter, were built on magnesium, aluminum and steel metal forms having cylindrical, rectangular, oval and spheroid shapes. For example, the oval shaped magnesium metal forms had general dimensions of 12 inches wide by 18 inches long by 4 inches deep. Although the containers themselves had irregular projections, there were generally no sharp corners since the projections themselves had about 0.5 to about 1 inch radii.

The magnesium metal oval form was prepared by blasting with 20–50 mesh sand at an air pressure in the range of about 85 to about 100 pounds per square inch (psig). The blasted surface was cleaned with methyl ethyl ketone and allowed to quickly dry at a temperature of about 25°C.

The prepared container's surface was coated with one brush coat of cement which was allowed to dry to touch and form a coating having a thickness of about 2 mils. The cement had been prepared according to the following Table 1:

TABLE 1

| Compound | Parts |
| --- | --- |
| fluorocarbon elastomer[1] | 100 |
| magnesium oxide | 15 |
| furnace carbon black pellets | 20 |
| curing agent | 2.5 |
| (N,N'-dicinnamylidene-1,6-hexane diamine) | 2.5 |
| methyl ethyl ketone (to provide a 30% solids solution) | 321 |

[1]obtained as Viton B-50 from the DuPont DeNemours Co

To the cement coat was then applied a sheet of polyfluorocarbon elastomer having a thickness of about 0.05 inch which had previously been given surface tack by a light treatment with the methyl ethyl ketone. The polyfluorocarbon elastomer sheet was pressed onto the cement coat to enhance its adhesion. Additional layers of cement and polyfluorocarbon elastomer were successively applied until eight layers of the polyfluorocarbon had been applied along with a final outer layer of cement. For this example, the polyfluorocarbon sheet was prepared according to the following Table 2:

TABLE 2

| Compound | Parts |
|---|---|
| fluorocarbon elastomer[1] | 100 |
| magnesium oxide | 15 |
| furnace carbon black pellets | 20 |
| curing agent (N,N'-dicinnamylidene-1,6-hexanediamine) | 2.5 |
| low molecular weight polyethylene | 3 |

[1] obtained as Viton B-50 from the DuPont DeNemours Co

Over the outer cement layer on the last polyfluorocarbon elastomer sheet was applied a layer of textile woven polyaramide cloth having a weight of about 12 ounces per square yard. The cloth had been previously prepared by cutting to size and coating of polyfluorocarbon cement as described in Table 1 applied and allowed to dry to touch. Three additional coats of the cement were similarly applied and allowed to dry to touch between these coatings. The coated fabric was then pressed onto the outer cement-coated polyfluorocarbon layer and stitched to remove any pockets of air. Similarly, three additional successive layers of polyaramide cloth were applied and any splices between sheets were allowed to lap between one-half inch to three-fourths inch. The exterior surface of the last applied layer of cloth was coated with three successive coats of polyfluorocarbon cement of the recipe shown in Table 1 and allowed to dry.

Over the outer layer of cement-coated polyaramide fiber was applied a textile woven glass fiber impregnated with high temperature-resistant epoxy resin. The impregnated cloth had been cut to the size required and dampened with methyl ethyl ketone in order to provide tack. The glass fabric was pressed onto the tacky outer cement layer on the polyaramide fabric and stitched to remove any trapped air. Similarly, eleven additional layers of the impregnated fiber glass coat was applied and epoxy allowed to cure.

EXAMPLE II

A ballistic test was conducted on the prepared container of Example I by substantially filling the container with oil heated to 205°C and firing 0.50 caliber APM2 and 0.60 caliber T80E2 ammunition into the side of the tank. The ballistic missile pierced the side of the container with minimal escape of oil from its point of entry and the opposite wall withstood the severe hydraulic ram-shock effect without appreciable delamination.

While certain representative embodiments and details have been shown for the purpose of illustrating the invention, it will be apparent to those having skill in this art that various changes and modifications may be made therein without departing from the spirit or scope of the invention.

What is claimed is:

1. A laminated container suitable for containing lubricating oil at a temperature in the range of about 150° to about 230°C and characterized when containing lubricating oil at a temperature in the range of about 150° to about 230°C by withstanding the puncture of an impacting 0.50 caliber APM2 service projectile with a minimal escape of oil and withstanding its accompanying hydraulic ram-shock effect without appreciable delamination, said laminated container comprising an oil-impervious rigid container having adhered to its outer surface a laminate of outwardly successive adherent laminae comprising a first rubbery polyfluorohydrocarbon composition lamina having a thickness of about 0.3 to about 0.6 inch adhered to said rigid container with a polyfluorohydrocarbon cement and a second lamina having a thickness of about 0.03 to about 0.12 inch of about four to about eight layers of a flexible, substantially non-extensible textile woven fabric selected from aromatic polyamides and polyaramides coated with a flexible polyfluorocarbon composition, said second lamina adhered to said first lamina with a polyfluorohydrocarbon cement.

2. The laminated container of claim 1 having adhered thereto a third outer rigid lamina of multiple layers of substantially polymer-encapsulated glass fibers.

3. The laminated container of claim 2 where said first lamina has a thickness in the range of about 0.3 to about 0.6 inches comprised of a highly halogenated hydrocarbon chain polymer composed substantially exclusively of carbon, hydrogen fluorine and, if desired, chlorine and bromine, where said second lamina has a thickness in the range of about 0.03 to about 0.12 inches comprised of about four to about eight layers of a woven textile fabric having a weight of about 10 to about 15 ounces per square yard and a thickness in the range of about 0.008 to about 0.016 inches, said individual fabric layers coated with said halogenated hydrocarbon chain polymer and where said rigid third lamina has a thickness in the range of about 0.008 to about 0.2 inch comprised of about four to about 14 layers of a polymer encapsulated textile woven glass fiber, where said encapsulating polymer is selected from polyester and thermoset epoxy polymers.

4. The laminated container of claim 3 where said polyfluorohydrocarbon for said first lamina and for cements for adhering said second lamina has at least 10 percent of the carbon atoms in its structure of the type bonded only to hydrogen atoms and other carbon atoms and is prepared by copolymerizing a mono-olefin selected from $CF_2=CH_2$, $CFH=CH_2CH_2=CH_2$, $CH_2=CH_2$, $CFCl=CH_2$, $CClH=CH_2$, $CHBr=CH_2$ and

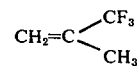

with highly fluorinated mono-olefins selected from $CF_2=CFCl$, $CF_2=CCl_2CF_3—CF=CF_2CF_2=CHCl$, $CF_3—CCl=CCl—CF_3$, $CF_3=CHF$, $CF_3—CH=CH—CF_3$ (cis or trans), $CF_2=CF_2$,

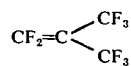

$CF_2=CFBr$, $CF_2=CCl—CF_3$, $CF_3—CH=CH_2$ and $CF_3—CCl—CCl_2$, and where the encapsulating polymers of said third lamina is a thermoset epoxy.

5. The laminated container of claim 4 where said glass fibers are non woven.

* * * * *